Patented May 1, 1934

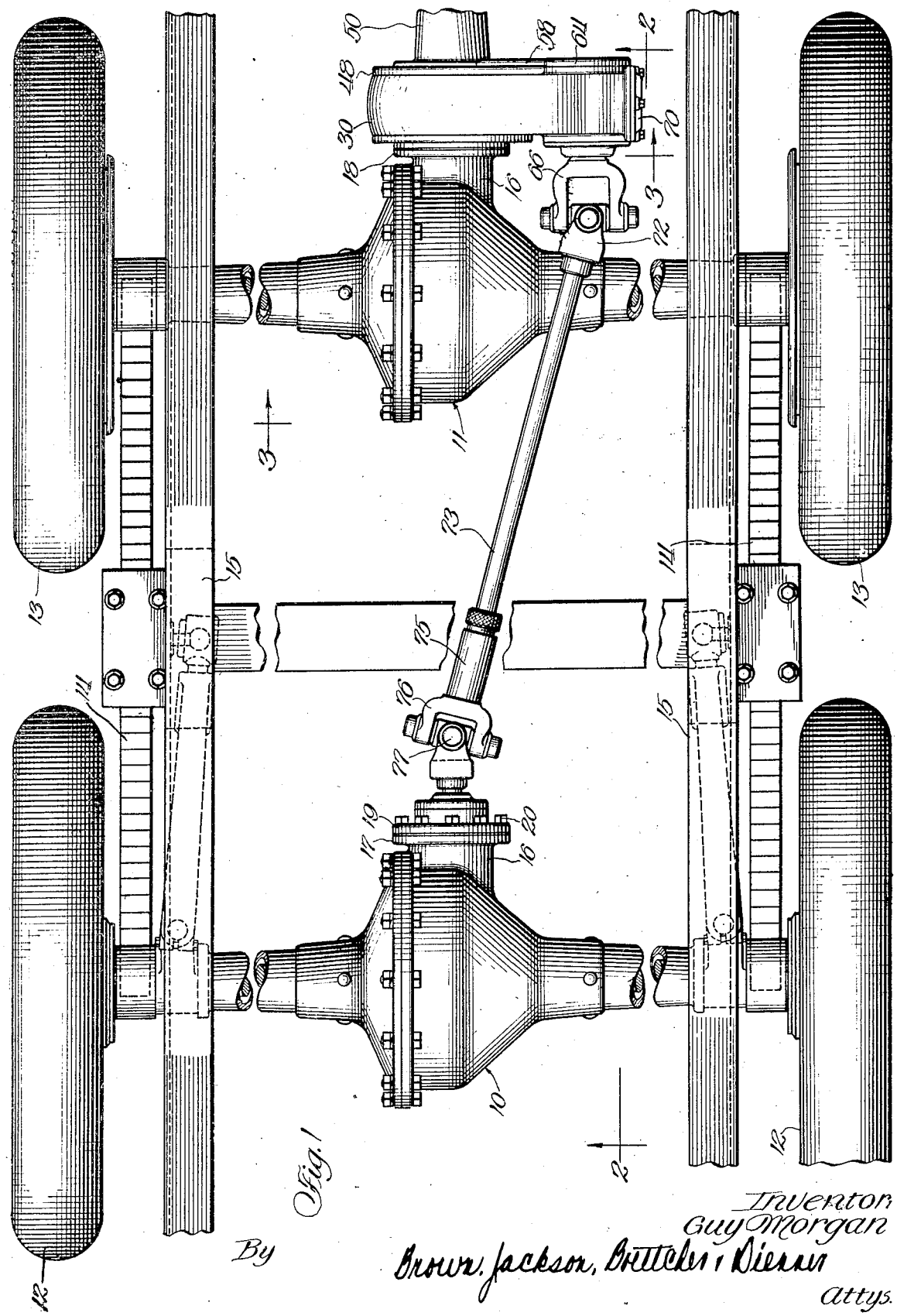

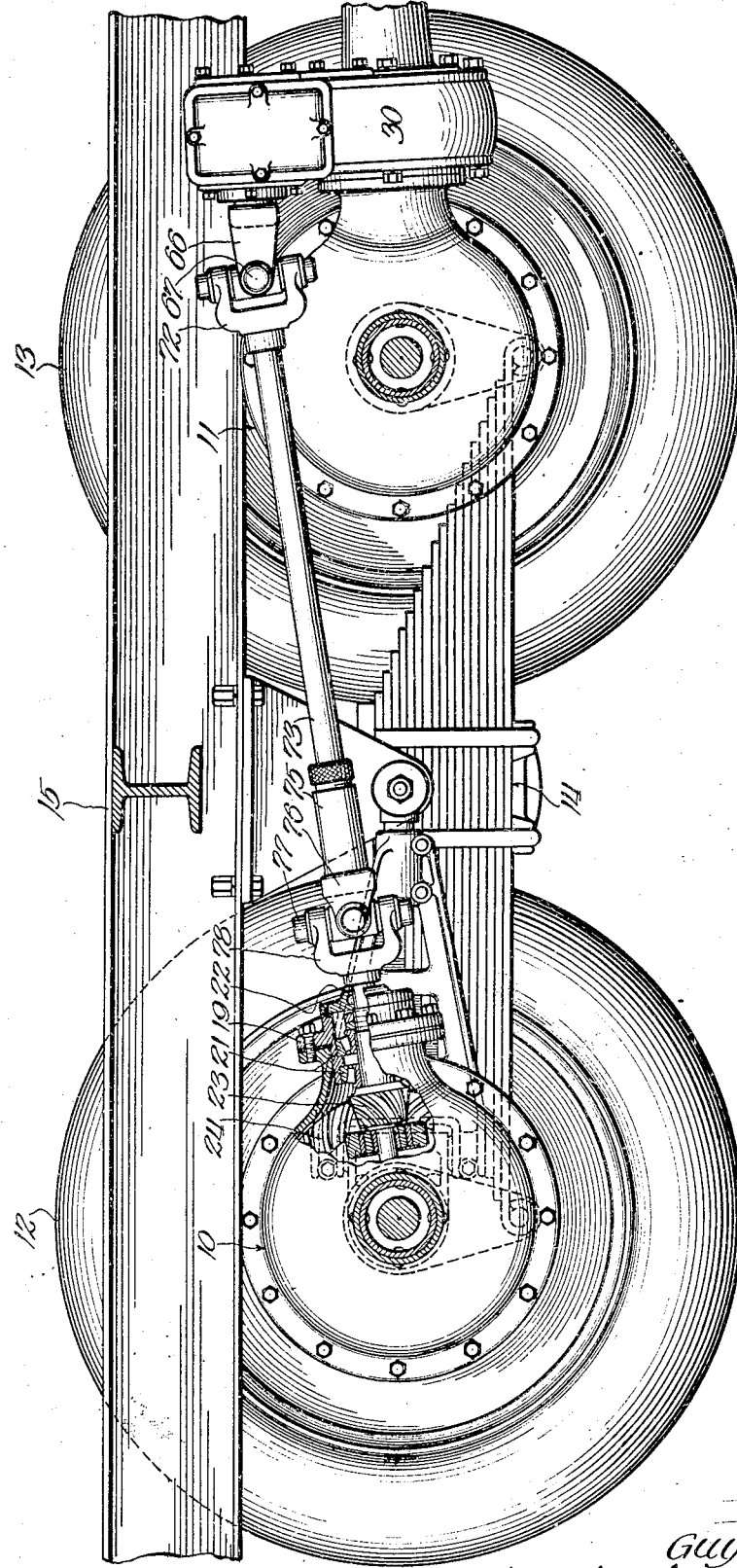

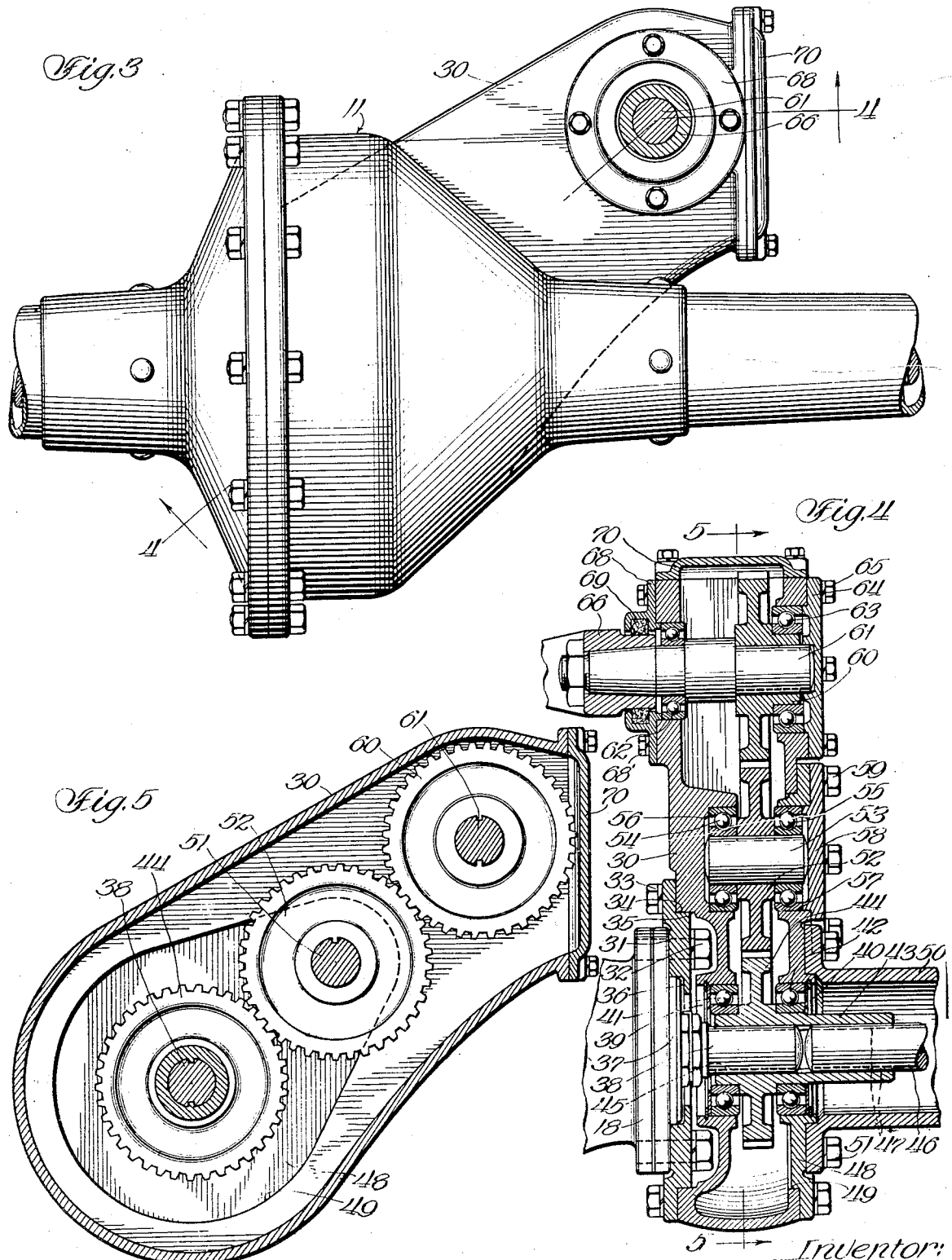

1,956,583

UNITED STATES PATENT OFFICE 1,956,583

DRIVE FOR MOTOR VEHICLES

Guy Morgan, New York, N. Y., assignor to The Warford Corporation, New York, N. Y., a corporation of New York Application January 23, 1932, Serial No. 588,302

5 Claims. (Cl. 180—22)

This invention relates to a drive for motor vehicles.

It is old in the prior art to provide two driving axles for a motor vehicle, such as a truck or bus, and to drive the rear one of these two axles through an auxiliary propeller shaft which is connected by a gear train to the main propeller shaft. The main propeller shaft is directly connected to the front one of the driving axles. These prior art devices of which I am aware have used right hand and left hand driving axle assemblies to the rear one of which the auxiliary propeller shaft is directly connected, that auxiliary propeller shaft being driven in a direction reverse to that of the main propeller shaft. In certain other of the prior art devices of which I am aware both driving axles are the same and the auxiliary propeller shaft is connected to the axle which it drives by a gear train and is also connected to the propeller shaft by a gear train. The auxiliary propeller shaft revolves in a direction opposite to that of the main propeller shaft.

My present invention improves upon these prior art devices by providing an arrangement which permits the use of two identical driving axles which may be standard stock axles available upon the open market. The front one of these axles is connected to the propeller shaft of the vehicle as before. A gear train is interposed in the propeller shaft ahead of the front axle. This gear train preferably comprises an odd number of gears, 3 for example, through the operation of which the auxiliary propeller shaft is driven in the same direction as the main propeller shaft. The auxiliary propeller shaft is directly connected to the rear one of the driving axles. This arrangement permits the use of identical driving axles and reduces the total number of gears that must be used in conjunction with the axle to drive the vehicle.

My three gear drive arrangement is further advantageous in that it permits spacing the center of the auxiliary propeller shaft sufficiently distant from the main propeller shaft to permit the former to clear the housing in which the front driving axle is encased without the use of large gears. Small gears have a lower peripheral speed at a given speed of rotation and consequently the noise, wear and difficulties of lubrication of the meshed teeth are less than for larger gears. The gears are encased in a single housing which is provided with a quantity of lubricant, so that they may be run for a long period of time without attention.

In order to compensate for unevenness of the roadway over which the vehicle may be driven, great flexibility is built into the suspension by which the frame is supported upon the driving axles. In order to facilitate steering of the vehicle the distance between centers of the driving axle must be as small as possible. The maximum length of the auxiliary propeller shaft is limited by the distance between centers of the driving axles. By connecting this shaft directly to the rear one of the driving axles, and by placing the gear box ahead of the front one of the driving axles, the auxiliary propeller shaft is relatively long and the distance between the universal joints contained in it is sufficient to permit the vehicle to be driven over rough ground without flexing the auxiliary propeller shaft to such an extent that the universal joints must operate at an angle too great for efficient transmission of power.

My invention will be best understood by reference to the accompanying drawings in which a preferred embodiment of it is shown by way of example and in which:

Figure 1 is a plan view of a motor vehicle equipped with the drive of my invention;

Figure 2 is a fragmentary sectional view taken substantially along line 2—2 of Figure 1 looking in the direction of the arrows;

Figure 3 is a fragmentary elevational view of the front one of the driving axles showing the gear box attached thereto and taken substantially along the line 3—3 of Figure 1;

Figure 4 is a cross sectional view through the gear box taken along the line 4—4 of Figure 3 looking in the direction of the arrows; and Figure 5 is a cross sectional view of the gear box taken along the line 5—5 of Figure 4 looking in the direction of the arrows.

In the drawings, driving axles 10 and 11 are carried on wheels 12 and 13, respectively, and support springs 14 by which the frame 15 of the vehicle is carried. The details of construction of the frame and spring suspension therefor are not of the essence of the present invention and an underslung suspension is shown by way of example only.

The rear axles 10 and 11 shown are standard driving axle assemblies including a casing, axles and a differential connecting the axles. Axles 10 and 11 are identical in every respect.

Extending outwardly from the central portion of the axles 10 and 11 are cylindrical members 16 terminating in flanges 17 and 18, respectively. A bearing supporting collar 19 is attached to the flange 17 in any preferred manner such as by bolts 20. This collar contains bearings 21 which support a short shaft 22 in the housing. This shaft carries a pinion 23 which is meshed with the ring gear 24 of the differential unit to drive the same.

The flange 18 of the axle 11 serves as a mounting support for the gear box 30 in which are contained the gears by which the rear axle 10 is driven. As will be best seen in Figure 4, a mounting plate 31 is attached to the flange 18 by bolts 32. The casing 30 of the gear box is attached to this mounting plate 31 by bolts 33. The plate 31 is shouldered at 34 and the gear box 30 is provided with an opening 35 which accurately registers with the shoulder 34 to definitely locate the gear box upon the axle housing.

The plate 31 is recessed at 36 to support a bearing 37 by which a shaft 38 is supported in the axle assembly. This shaft 38, like the shaft 22, carries a pinion meshed with the ring gear of the differential unit of the axle 11.

Bearing supports 39 and 40 are formed in the gear box 30 to receive the bearings 41 and 42, respectively, which bearings engage the hub 43 of a gear 44 to support the same. The hub 43 is registered with the end of shaft 38 and rigidly attached thereto in any preferred manner such as by keys or splines 45. The shaft 38 extends but part way through the hub 43 of the gear 44.

The main propeller shaft by which the driving axles are connected to the motor of the vehicle is shown at 46. This shaft is also connected to the hub 43 by keys or splines indicated at 47. The axle 46 is capable of limited movement in and out of the hub 43.

The bearing support 40 is located in a removable plate 48 which is shouldered to accurately fit in an opening 49 in the main portion of the box 30. The propeller shaft housing 50 is attached to this plate 48 in any preferred manner such as by bolts 51.

An intermediate idler gear 52 is journaled upon a shaft 53 which is carried by bearings 54 and 55. The bearing 54 is seated in a recess 56 in the housing 30, and bearing 55 is seated in a recess 57 in the plate 48. A removable cover plate 58 is also registered with the recess 57 and serves to retain the bearing 55 in place therein. Plate 58 is attached to the gear box by bolts 59. Gear 52 is meshed with the gear 44 and also meshed with a third gear 60 which is supported upon a shaft 61. This shaft is journaled in bearings 62 and 63 which are fitted in suitable recesses in the gear box 30. A removable cover plate 64 registers with the bearing 63 to hold it in place in its recess, this plate being attached to the gear box by bolts 65. Shaft 61 projects out of the rear side of the gear box 30, that is, the side opposite the side to which the propeller shaft casing 50 is attached. One element 66 of the forward universal joint 67 is attached to the shaft 61. A removable plate 68 carries a grease retainer 69 which engages the universal joint element 66, and the plate 68 engages the bearing 62 to retain it in place in the recess in which it is fitted. Plate 68 is attached to the gear box in any preferred manner as by bolts 68'.

The uppermost end of the gear box is provided with a cover plate 70 closing an opening which is sufficiently large to permit entrance and removal of the gears therefrom. This plate is removable to permit access to the gears for inspection and maintenance.

As shown, the gear box 30 is a metallic casting, preferably iron or steel, and is provided with a liberal number of removable plates by which its contents can be reached. The specific details of the construction of the gear box may be varied to meet particular requirements within the teachings of my invention.

The universal joint 67 having one element 66 carried by the shaft 61 and a second element 72 to which the auxiliary propeller shaft 73 is attached is located ahead of the driving axle 11 as will be best seen in Figure 2. The universal joint 67 is located above and to one side of the center of the driving axle and it is spaced sufficiently distant from the center of that axle to provide ample clearance for the auxiliary propeller shaft 73 when the vehicle is driven over irregular ground. The clearance shown in the drawings is sufficient to permit the use of the gear box 30 upon a standard stock axle of the so-called banjo type, should it be desired to do so.

The auxiliary propeller shaft 73 is joined by telescopic connection 75 to the member 76 of universal joint 77, the companion member 78 of that joint being rigidly attached to the shaft 22 of the driving axle 10. Since the universal joint 78 is located immediately in front of the driving axle 10 and the universal joint 67 is located immediately in front of the driving axle 11, the auxiliary propeller shaft 73 is long, and universal joints 67 and 77 will not be bent to an angle sufficiently acute to prevent them from functioning properly when the vehicle is driven over rough or irregular ground. The telescopic connection 75 compensates for variations in the distance between the universal joints under these conditions.

Because of the relatively small diameter of the gears 44, 52 and 60, the spur gears shown by way of example may be satisfactorily operated without producing undue noises. However, I am not to be limited to the use of spur gears, as spiral cut gears, herring bone gears or any of the so-called silent running gears may be used within the teachings of my invention.

Having thus shown and described a preferred embodiment of my invention what I consider new and desire to have protected by Letters Patent is pointed out in the appended claims.

What is claimed is:

1. A drive for motor vehicles comprising a pair of spaced axle assemblies, a gear box carried by one of said axle assemblies and spaced forwardly thereof, a main propeller shaft extending into said gear box, a pinion-carrying propeller shaft extending from said axle assembly into said gear box coaxially with the main propeller shaft, a gear in said box having a laterally extending hub portion mounted upon and having splined engagement with the adjacent end portions of both of said propeller shafts, a gear train driven by said gear, and an articulated shaft driven by said gear train and having driving connection to said other axle assembly.

2. In a four-wheel drive for motor vehicles comprising a pair of identical wheel-carrying driving axle assemblies spaced apart, the combination of a gear box carried by one of said axle assemblies and spaced forwardly thereof, a main driving shaft extending into said gear box, a pinion-carrying propeller shaft extending from said axle assembly into said box, a gear in said gear box having a laterally extending hub portion keyed upon both of said shafts and providing for direct driving connection between said shafts, said driving shaft having axial movement within said hub portion, a gear train in said gear box driven by said gear, and an articulated shaft driven by said gear train and having driving connection to said other axle assembly.

3. A drive for motor vehicles comprising a pair of spaced axle assemblies of identical construction and having pinion-carrying propeller shafts extending forwardly thereof, similar housings for each of said axle assemblies, a gear box carried by the forward one of said housings and extending forwardly thereof and enclosing said pinion-carrying propeller shaft of said forward housing, a main propeller shaft extending into said gear box, a gear in said box keyed directly to said forward pinion-carrying propeller shaft and to said main propeller shaft, a gear train in said box driven by said gear, and an articulated shaft driven by said gear train in the same direction of rotation as said propeller shaft and having driving connection to the other of said pinion-carrying propeller shafts.

4. A drive for motor vehicles comprising a pair of spaced axle assemblies, a gear box secured to one of the assemblies, a main propeller shaft extending into said gear box, a shaft extending from said axle assembly into the gear box coaxially with the main propeller shaft, a gear in said box having a hub portion mounted upon and splined to the adjacent end portions of both of said shafts, a gear train driven by said gear, and an articulated shaft driven by the gear train and having driving connection to the other axle assembly.

5. A drive for motor vehicles comprising a pair of spaced axle assemblies, a gear box secured to one of the assemblies, a main propeller shaft extending into said gear box, a shaft extending from said axle assembly into the gear box coaxially with the main propeller shaft, a gear in said box having a hub portion directly connected to the adjacent end portions of both of said shafts and establishing a direct driving connection therebetween, a gear train driven by said gear, and an articulated shaft driven by the gear train and having driving connection to the other axle assembly.

GUY MORGAN.